United States Patent [19]

Buzzell et al.

[11] 4,184,452

[45] Jan. 22, 1980

[54] INSECT CONTROL COLLAR WITH REPLACEABLE CHEMICAL MEMBER

[76] Inventors: John E. Buzzell, 6300 N. Central Expressway, Dallas, Tex. 75206; Robert Willens, Rte. 7, Box 162K, McKinney, Tex. 75069

[21] Appl. No.: 835,798

[22] Filed: Sep. 22, 1977

[51] Int. Cl.² ............................................ A01K 27/00
[52] U.S. Cl. .................................... 119/106; 119/156
[58] Field of Search .................. 119/96, 106, 109, 156

[56] References Cited

U.S. PATENT DOCUMENTS

| 2,219,569 | 10/1940 | Vanderhoof | 119/96 |
| 2,808,030 | 10/1957 | Costanzo | 119/106 |
| 4,031,859 | 6/1977 | Stewart | 119/106 |
| 4,047,505 | 9/1977 | McAndless | 119/156 X |

Primary Examiner—Louis G. Mancene
Assistant Examiner—Robert P. Swiatek
Attorney, Agent, or Firm—Richards, Harris & Medlock

[57] ABSTRACT

An animal collar having a member which disperses a chemical to rid the animal of fleas and ticks wherein the chemical-carrying member is periodically replaced for extended use of the collar. The chemical-carrying member is removably attached to the collar for easy replacement when the supply of chemical is exhausted.

3 Claims, 6 Drawing Figures

INSECT CONTROL COLLAR WITH REPLACEABLE CHEMICAL MEMBER

CROSS-REFERENCE TO RELATED APPLICATION

See copending application entitled Refillable Flea and Tick Collar, Ser. No. 788,089, filed Apr. 15, 1977 and now abandoned.

BACKGROUND OF THE INVENTION

The present invention pertains to animal collars and harnesses and more particularly to a collar or harness which disperses a chemical to rid the animal of fleas and ticks.

The conventional animal flea collar consists of a chemically impregnated plastic strap which is tied about the animal's neck. The plastic allows the chemical to slowly escape thereby ridding the animal of fleas for a period of time. However, when the chemical is exhausted the collar is no longer effective and therefore must be discarded and replaced with a new collar. Such collars are generally effective for a period of from one to three months. See U.S. Pat. No. 3,918,407 to Greenberg for a description of this type of pet collar. This type of collar does not have sufficient strength to serve as a restraining collar or to carry necessary license and vaccination tags, therefore, many animals, especially dogs, must wear both restraining collars and flea control collars.

A second type of flea retardant device is the flea tag. In this device, the flea retardant chemical is carried in a plastic tag which is attached to the animal's collar. The chemical is dispersed by the tag in a method similar to that of the collar. This device is generally less effective than the collar since its area of contact with the animal is limited. And, like the collar, the tag must be replaced when the chemical is exhausted.

The present invention solves both the replacement problem and the double collar problem by providing a sturdy collar to which is removably attached a member that disperses the flea or tick retardant chemical.

SUMMARY OF THE INVENTION

In accordance with the present invention, there is provided an improved flea and tick control collar for an animal in which the chemically dispersive member is easily detached and replaced for extended use of the collar. The improved collar includes a conventional restraining collar to which are attached snap fasteners for attaching a chemically-impregnated strip with corresponding snap fastening elements. When the chemical in the attached member has dispersed, the member is unsnapped and replaced with a fresh member for continued use of the collar. As an alternative, the chemically-impregnated member is attached to the collar by means of a VELCRO fastener or netting.

There is also disclosed an animal harness which includes the replaceable insect repellent chemical structure as above described.

DETAILED DESCRIPTION OF THE INVENTION

The problems caused by fleas and ticks present on household pets have long been recognized. The insects not only irritate the animals but can be transferred to persons living in the vicinity of the animals. The ticks and fleas can also carry diseases which are transmittable to humans. In response to these problems, methods have been developed for ridding household pets of such insects. The methods include dipping the animal in an insecticide solution, dusting flea powder onto the animal, and the most common present method, the chemically-impregnated plastic flea collar.

Although the above methods have varying degrees of success, each has certain drawbacks to its use. The dipping method is inconvenient as well as expensive since it is usually carried out in a veterinarian's office. Dusting with flea powder is hazardous both to the pet and to the owner since it is difficult to control the exact amount that should be applied. The plastic flea collar is generally effective, but it has only a short lifetime, from one to three months, and at the end of this time it must be replaced. The periodic replacement of the flea collar presents a substantial expense to pet ownership. The plastic collar does not have sufficient strength for use as a restraining collar, therefore, it must be used in conjunction with a conventional collar. Thus, pets are often required to wear two collars simultaneously.

In accordance with the present invention there is provided a flea collar which includes a physically restraining collar body that provides for attachment of leashes, licenses and vaccination tags, and to which is easily attached a member that disperses a flea retardant chemical. When the chemical in the element is dissipated, the old element is removed and a new one is snapped in place. Varying sizes of members are utilized to adjust the quantity of chemical that is desired to be used with a particular animal.

The chemical for use in the collar can be one that either kills the fleas and ticks or one that repels the insects and drives them from the animal.

Figure 1:
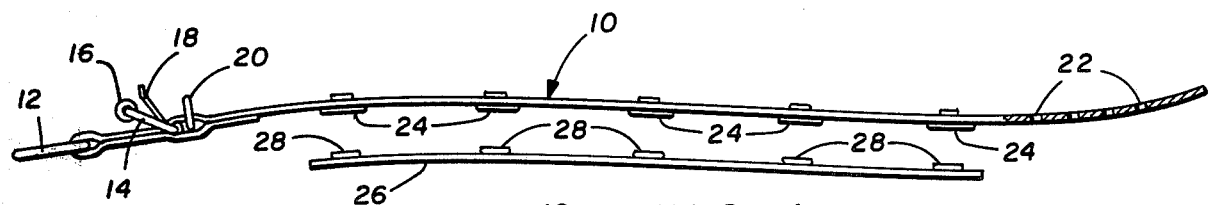
FIG. 1 is an elevation view of one embodiment of the present invention.

The preferred embodiment of the invention is shown in FIG. 1. An animal collar body 10 made of conventional plastic or textile material has attached at one end a keeper 12. Joined to the collar body 10 near the keeper 12 is a buckle ring 14 having a buckle roller 16 disposed thereon. Rotatably attached to the buckle ring 14 is a buckle tongue 18 which rotates to contact the buckle roller 16. A keeper ring 20 is disposed near the buckle ring 14 to maintain the opposite end of the collar body 10 in position after it has been fed through the buckle ring 14. A series of tongue holes 22 are disposed along the end of the collar body 10 opposite the keeper 12.

Spaced along the collar body 10 are a series of male snap fastener elements 24 disposed on the inner side of the collar as it is worn on the animal.

A chemically-impregnated strip 26 has a series of female snap fastener elements 28 disposed along the length thereof. The female snap fastener elements 28 are spaced to correspond to the male snap fasteners 24 on the collar body 10. Thus, the chemically-impregnated member 26 can be snap fitted to the collar body 10.

In operation, the chemically-impregnated member 26 is attached to the collar body 10 by means of the snap fastener elements 24 and 28. The collar body 10 is then wrapped about the neck of the animal with the chemically-impregnated member 26 on the inside. The ends of the collar are joined together by means of the buckle ring 14, buckle tongue 18, and tongue holes 22. The chemically-impregnated member 26 contains a chemical such as VAPONA (Trademark registered by Shell Chemical Co.) which is slowly released to rid the animals of fleas and ticks. When the chemical supply in the member 26 is exhausted, it is unsnapped from the collar body 10 and discarded. A new member 26 is then attached to the collar body 10 and the collar is replaced on the animal. As shown, the chemically-impregnated member 26 is disposed between the collar body 10 and the animal's skin to provide immediate contact of the chemical to the animal's skin, however, the chemically-impregnated member 26 can also be disposed on the outer side of the collar body 10.

Figure 2:
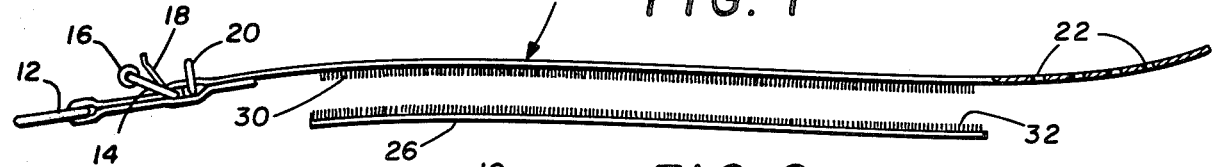
FIG. 2 is an elevation view of a further embodiment of the present invention.

An alternate embodiment of the present invention is illustrated in FIG. 2 in which the snap fastener elements 24 and 28 have been replaced with first and second VELCRO strips 30 and 32. First VELCRO strip 30 is joined to collar body 10 and second VELCRO strip 32 is joined to chemically-impregnated member 26. Thus, the chemically-impregnated member 26 can be easily attached and removed relative to the collar body 10.

Figure 3:
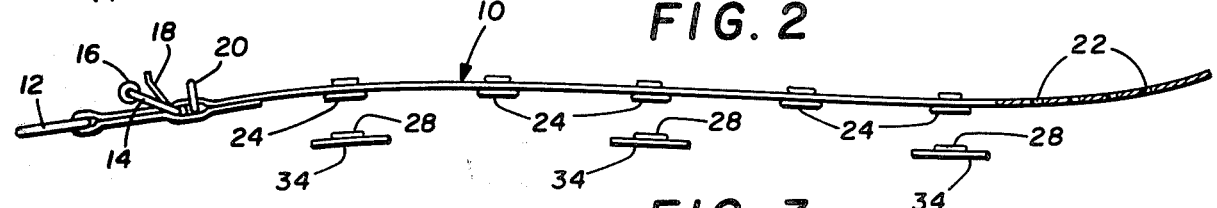
FIG. 3 is an elevation view of a further embodiment of the present invention.

A further embodiment of the present invention is shown in FIG. 3. This embodiment is similar to that shown in FIG. 1 with the exception that the chemically-impregnated member 26 is subdivided into chemically-impregnated tabs 34, each of which has a female snap fastener element 28. The individual tabs 34 are joined to the collar body 10 by means of the snap fastener elements 24 and 28. With the individual tabs 34, any number of tabs may be used to apply the desired amount of flea retardant chemical. The amount to be applied is dependent upon such factors as the size of the animal, the severity of the local flea and tick problem, the sensitivity of the animal to the flea retardant chemical, and the environment in which the animal is located. And like the embodiments shown in FIGS. 1 and 2, the chemically-impregnated tabs 34 can be disposed on either the inner or outer side of the collar body 10.

Figure 4:
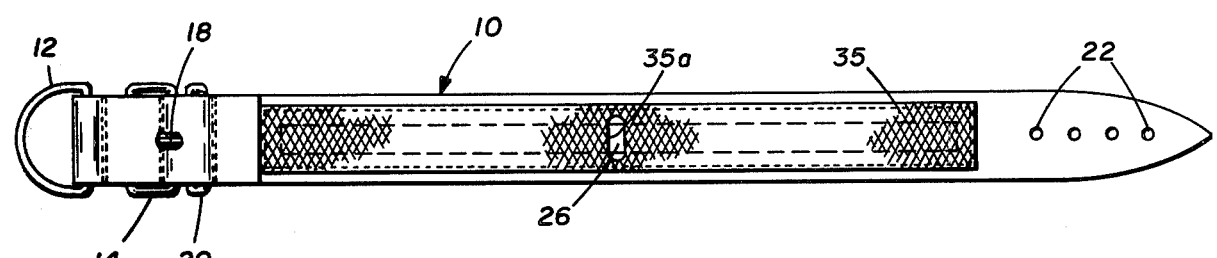
FIG. 4 is an elevation view of a further embodiment of the present invention.

FIG. 4 illustrates another embodiment of the present invention. A rectangular netting member 35 is sewn along its edges to join it to the collar body 10. A slot 35a is formed in central portions of the netting member 35. The chemically-impregnated member 26 is disposed between the collar body 10 and the netting member 35, and is installed and removed by passing it through the slot 35a. Since the slot 35a is not located at either end of the netting member 35, the chemically-impregnated member 26, once inserted, will be held securely in place. Netting member 35 is an open weave material with holes of approximately 1/16 to ½ inch in width. Such material provides for free air flow and unrestricted dispersion of the flea and tick repellent chemical from the chemically-impregnated member 26. The netting can be made of any natural or man-made fiber with nylon being a preferred material.

Figure 5:
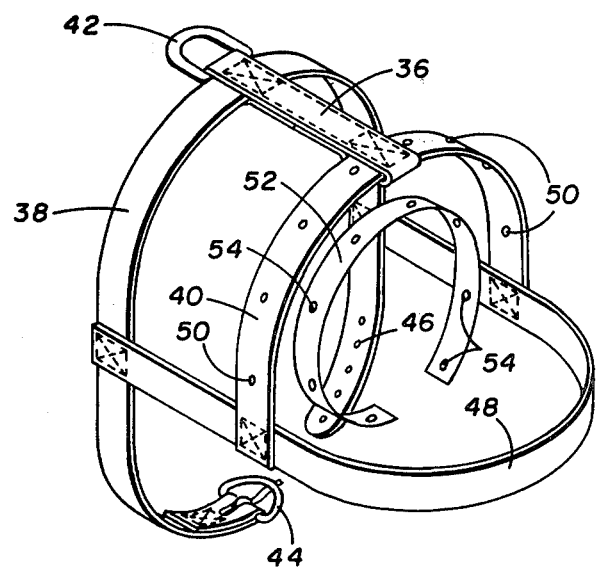
FIG. 5 is a perspective view of a further embodiment of the present invention.

A harness embodiment of the present invention is illustrated in FIG. 5. The harness comprises a longitudinal strap 36 which is joined transversely to a stomach strap 38 and a shoulder strap 40. Disposed at one end of the longitudinal strap 36 is a D-ring 42. Located at one end of the stomach strap 38 is a buckle and tongue set 44 and at the opposite end of the stomach strap 38 are a series of tongue holes 46. A chest strap 48 is parallel to the longitudinal strap 36 and is joined to both the stomach strap 38 and the shoulder strap 40.

Along the shoulder strap 40 are a series of male snap fastener elements 50 disposed on the inner side of the harness. A chemically-impregnated member 52 has disposed along its length a series of female snap fastener elements 54 spaced in the same manner as the male snap fastener elements 50 on the shoulder strap 40.

The harness is used in the same manner as the collar described above. The chemically-impregnated member 52 is snapped into position on the shoulder strap 40 and the harness is placed on the animal. When the chemically-impregnated member 52 has exhausted the supply of repellent chemical, the member is removed and a fresh chemically-impregnated member 52 is snapped into place.

Figure 6:
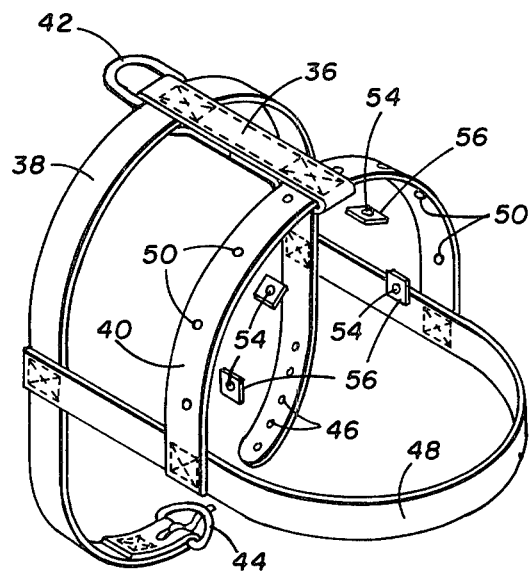
FIG. 6 is a perspective view of a still further embodiment of the present invention.

A still further embodiment of the present invention is shown in FIG. 6. This harness is similar to the one described in FIG. 5 with the exception that the chemically-impregnated member 52 is subdivided into a series of chemically-impregnated tabs 56 with each tab having a female snap fastener element 54 disposed thereon. The individual tabs 56 are snap fastened to the shoulder strap 40 and offer the same advantages as described for the tabs 34 in the collar embodiment illustrated in FIG. 3.

Snap fastener elements 50 and 54 in the harness embodiment shown in FIGS. 5 and 6 can be replaced with either VELCRO fasteners or netting as described for the collar embodiments.

Although the chemically-impregnated member 52 and chemically-impregnated tabs 56 are illustrated as disposed on the inner side of the shoulder strap 40, they can be disposed on either the inner or outer sides of any of the harness members.

Thus, in accordance with the present invention there is provided a flea and tick collar and harness with a replaceable chemical member which is detached when the supply of chemical is exhausted and replaced with a fresh member. An alternate embodiment provides a plurality of individual replaceable chemical elements.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. An insect control collar for an animal wherein the collar has a chemical which is slowly dispersed to repel or kill insects on the animal, comprising in combination;
   (a) a flexible elongate collar body dimensioned to encircle the neck of the animal,
   (b) means for releasably securing the ends of said collar body to hold said collar body on the neck of the animal,
   (c) an elongate, porous netting member secured along the periphery thereof to the surface of said collar body adjacent the animal to form an elongate pouch,
   (d) said netting member having an opening in the midportion thereof to provide a passageway into said pouch, and (e) a flexible, elongate member impregnated with said chemical, said member having a length greater than either of the distances from said opening to the ends of said pouch and said member being dimensioned to pass through said opening securing said member within said pouch.

2. An insect control collar as recited in claim 1 wherein said chemically-impregnated member is a plastic strip.

3. An insect control collar as recited in claim 1 wherein said netting member extends for greater than one-half the length of said collar body.

* * * * *